United States Patent [19]

Ueda

[11] 4,288,097
[45] Sep. 8, 1981

[54] SHOULDER BELT FOR SEAT BELT DEVICE

[75] Inventor: Takeo Ueda, Fujisawa, Japan

[73] Assignee: Nippon Seiko Kabushiki Kaisha, Tokyo, Japan

[21] Appl. No.: 962,891

[22] Filed: Nov. 22, 1978

[30] Foreign Application Priority Data

May 12, 1978 [JP] Japan .............................. 53-62665[U]

[51] Int. Cl.³ .............................................. B60R 21/10
[52] U.S. Cl. .................................... 280/802; 297/468
[58] Field of Search ...................... 280/801, 802, 808; 297/468, 469, 481, 482, 483, 484

[56] References Cited

U.S. PATENT DOCUMENTS

| | | | |
|---|---|---|---|
| 3,241,882 | 3/1966 | Fredericks | 297/481 |
| 3,462,192 | 8/1969 | Fredericks | 297/481 |
| 3,811,703 | 5/1974 | Turkovich | 297/482 |
| 3,834,730 | 9/1974 | Kansier | 280/808 |
| 3,957,222 | 5/1976 | Bladh | 242/107.4 R |
| 4,026,494 | 5/1977 | Tanaka | 242/107 |
| 4,119,344 | 10/1978 | Kondo | 297/468 |

FOREIGN PATENT DOCUMENTS 2360702  6/1975  Fed. Rep. of Germany ...... 280/808

*Primary Examiner*—Joseph F. Peters, Jr.
*Assistant Examiner*—Randall A. Schrecengost
*Attorney, Agent, or Firm*—Shapiro and Shapiro

[57] ABSTRACT

In a seat belt device including at least a belt for constraining the upper half of the body of a seat occupant, the shoulder belt, when in occupant constraining position, is guided so as to prevent the end portion of the belt adjacent to the shoulder of the occupant from bearing against the neck or the head of the occupant.

2 Claims, 10 Drawing Figures

SHOULDER BELT FOR SEAT BELT DEVICE

BACKGROUND OF THE INVENTION

1. Field of the Invention

This invention relates to improvements in an occupant constraining belt, particularly, shoulder belt.

2. Description of the Prior Art

It is well-known to provide a shoulder belt to prevent damage from being imparted to a seat occupant during collision of vehicles or the like. It is also known to normally provide a slack in the shoulder belt because such a shoulder belt, if tightened, gives unpleasantness to the seat occupant (see, for example, U.S. Pat. No. 4,026,494). In such a case, however, the portion of the shoulder belt adjacent to the shoulder of the occupant bears against the neck or the face of the occupant and depending on the arrangement of the end portion of the belt near the shoulder, the edge of the belt bears against the neck at an angle approximate to 90° with respect to the neck, thus causing an unpleasant phenomenon known as neck-cutting. Also, the belt bears against the face or the belt exists in proximity to the face and this has reduced the view field or the visual perception of the seat occupant. Such tendency is pronounced in the so-called passive type constraining belt for forcibly constraining the seat occupant. This is because, in the passive type belt, a construction for automatically constraining the seat occupant, when entering the vehicle, is adopted and this requires a more complicated mechanism to be provided in the end portion of the shoulder belt near the shoulder of the seat occupant than in the case of a non-passive type belt and such a mechanism causes the end portion of the belt adjacent to the shoulder to be projected toward the interior of the vehicle while the end portion of the belt adjacent to the waist of the occupant lies at a substantially predetermined position so that the shoulder belt tends to approximate the vertical.

SUMMARY OF THE INVENTION

It is an object of the present invention to provide a shoulder belt which is simple in construction and yet highly effective to eliminate the unpleasant phenomenon called the neck-cutting.

The invention will become fully apparent from the following detailed description thereof taken in conjunction with the accompanying drawings.

DESCRIPTION OF THE PREFERRED EMBODIMENTS

Figure 1:
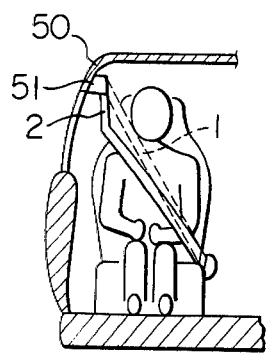
FIG. 1 shows the concept of the shoulder belt according to the present invention.

FIG. 1 is a front view for illustrating the concept of the present invention as seen from the front of a vehicle. In case of the shoulder belt of the prior art, the belt bears against the head, the face or the neck of the seat occupant at a position 1 as indicated by broken lines, but according to the present invention, the shoulder belt 2 extends as indicated by solid lines and does not bear against the neck of the seat occupant.

Figure 2:
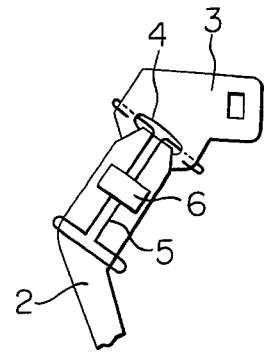
FIGS. 2 to 5 show the construction of the end portions of the shoulder belt according to first to fourth embodiments of the present invention which are adjacent to the shoulder of the seat occupant.

FIG. 2 shows a first embodiment of the present invention. The end of the belt 2 adjacent to the shoulder is connected to the vehicle body through a tongue member 3 and a tongue receiving member 51 provided on the side roof 50 of the vehicle body. The tongue member 3 may be replaced by an anchor member directly secured to the side roof. A piano wire 5, which is a resilient guide means, is engaged in an opening 4 formed in the tongue member 3, and the piano wire 5 extends along the surface of the belt 2 in the T configuration as shown and is attached to the belt surface at a suitable location as by a tape 6 or secured to the belt surface by sewing a patch of cloth thereon. The belt 2 is maintained in the position as indicated by solid lines in FIG. 1, by the resiliency of the piano wire. The resilient force of the piano wire is strong enough to prevent the belt from bearing against the neck and moreover, permits the belt to extend straight during a collision.

Figure 3:
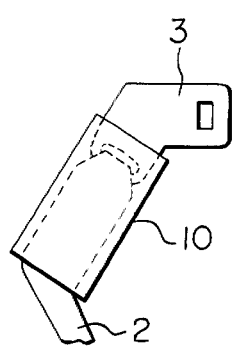
Figure 4:
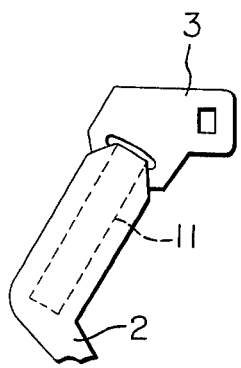
Figure 5:
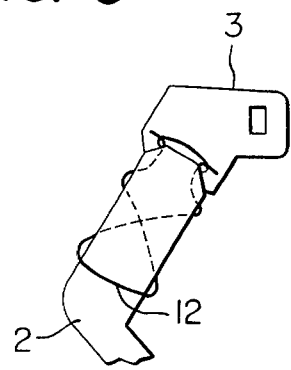

FIGS. 3 to 5 show second to fourth embodiments of the present invention. In these embodiments, the parts similar to those in the first embodiment are given similar reference numerals and need not be described. In the embodiment of FIG. 3, a sheath-shaped cover 10 of resilient resin material is used instead of the piano wire and the function of this cover is similar to that of the piano string in the embodiment of FIG. 2.

Referring to FIG. 4 which shows a third embodiment, a piano wire 11 is sewn into the belt web adjacent to the end of the belt.

Figure 8:
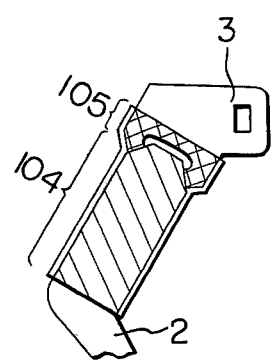
FIGS. 8 to 10 show the construction of the end portions of the shoulder belt according to sixth to eighth embodiments of the present invention which are adjacent to the shoulder of the seat occupant.

In FIG. 5, which shows a fourth embodiment, a figure 8-shaped piano wire 12 is wrapped around and joined to the end portion of the belt and the upper portion thereof is joined to the tongue member. In the embodiments of FIGS. 4 and 5, the function of the piano wires is similar to that of the piano string of the FIG. 2 embodiment.

Figure 6:
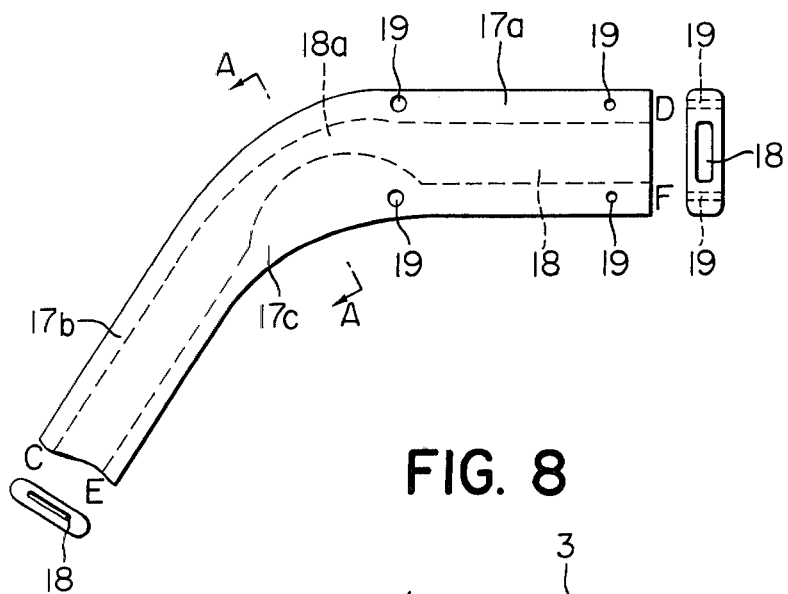
FIG. 6 is an enlarged view of essential portions of a fifth embodiment of the present invention.

FIG. 6 shows a through-boot 17 which is a sheath-shaped guide means which provides a fifth embodiment of the present invention. The through-boot 17 may be attached to the tongue member or the anchor member by threading a screw (not shown) into a threaded bore 19. The shown through-boot has a first portion 17a extending lengthwise of the vehicle body, and a second portion 17b which, when mounted to the tongue member, extends downwardly along the glass surface of a door (not shown) and which is bent from the first portion 17a at a suitable angle. The amount of downward extension of the second portion 17b and the angle formed by the first portion 17a and the second portion 17b must be of a degree that the shoulder belt 2 does not pass over the face or the neck of the seat occupant when the through-boot 17 is displaced to an occupant constraining position to bring the shoulder belt 2 to a constraining position. Therefore, the degree is somewhat varied by the relation between the position of the through-boot 17 when displaced rearwardly and the position of the seat.

Figure 7:
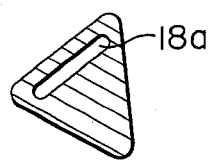
FIG. 7 is a cross-sectional view taken along line A—A in FIG. 6.

A belt guide path 18 extending through the through-boot 17 is formed such that curves CD and EF are substantially equal so as to ensure smooth relative movement of the through-boot 17 and the belt. That is, a guide path 18a at the bend 17c is in an elevated condition with respect to the plane of the drawing sheet, as shown in FIG. 7. The inner surface of the guide path 18 should preferably be as smooth as possible to ensure smooth sliding of the belt.

A material like resin is preferable in view of the nature, cost and ease of manufacture and the through-boot should normally be capable of simply guiding the shoulder belt and may be damaged or deformed during a collision.

FIG. 8 shows a sixth embodiment of the present invention. The end portion of the belt adjacent to the occupant's shoulder is attached to the side roof of the vehicle body by means of the anchor member of the tongue member 3 in a known manner. The portion 104 indicated by hatching is the portion which lies near the neck or the head of the occupant when the belt is in occupant constraining position. After the belt is attached to the anchor member 3, the portion of the belt indicated by hatching is integrally secured with the portion 105 of the anchor member 3 indicated by cross-hatching, by the use of resin, such as epoxy resin or glue. The resin may be applied by dipping, spraying or brush. After the resin is hardened, the belt portion 104 increases its rigidity by the hardened resin and since the resin is hardened integrally with the anchor portion, the belt portion 104 is limited in rotation about the anchor member 3. Thus, the belt portion 104 can be maintained as shown in FIG. 1. By this, the belt portion 104 does not bear against the head, the face or the neck of the occupant when the belt is at or near the constraining position or when the belt is approaching the constraining position, thus eliminating any unpleasantness and preventing reduction of the visual perception.

Figure 9:
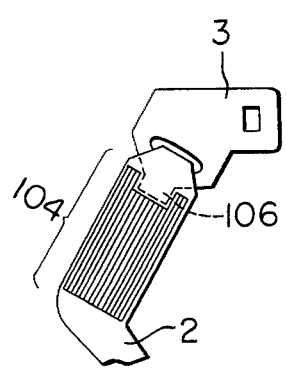

FIG. 9 shows a seventh embodiment of the present invention. In this embodiment, the portion 104 has a higher rigidity than the other portions of the belt by being sewn. To substantially prevent or limit the rotation of the portion 104 relative to the anchor member 3, the end portion of the anchor member extends until it overlaps the portion sewn to form a tongue-shaped portion 106, and the tongue-shaped portion 106 enters into the sewn portion of the belt. By this construction, as in the embodiment of FIG. 8, the belt portion 104 avoids the head, the face or the neck of the occupant when the belt is in constraining position.

Figure 10:
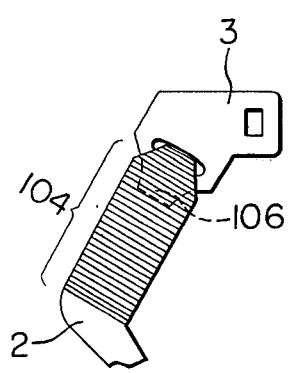

FIG. 10 shows an eighth embodiment of the present invention. In this embodiment, the belt portion 104 is enhanced in its rigidity by a greater number of wefts used than in the other portion such as portion 2. It is well-known to increase the number of wefts in a portion. In this embodiment, the limitation of the rotation of the portion 104 relative to the anchor member 3 is achieved by providing a tongue-shaped portion 106 as in the embodiment of FIG. 9.

In the sixth to eighth embodiments, the rigidity of the predetermined portion is enhanced and this rigidity is high enough to prevent that portion from bearing against the neck and moreover, permits the belt to extend straight during a collision.

According to the present invention, as has hitherto been described, there is provided a shoulder belt which is simple in construction and highly effective in practice.

It will be apparent that the present invention is applicable not only to the passive type shoulder belt but also to the conventional active type shoulder belt.

Particularly, in the case of the passive type shoulder belt, the belt tends to avoid the face of the occupant not only when the shoulder belt is in perfect constraining position but also when the shoulder belt is near such position (in the passive belt of the type which is displaced to its constraining position with the opening-closing of the door, such position is brought about when the door is somewhat opened), thereby eliminating the unpleasantness from the occupant when in such position.

What I claim is:

1. A seat belt device comprising a belt for constraining the upper half of the body of a seat occupant, means for connecting an upper end of the belt to a side roof of a vehicle body, the connecting means comprising a tongue having an opening therein for attaching the tongue to the end of the belt, and tongue receiving means attached to the side roof for connecting the tongue thereto, and a length of the belt adjacent to the upper end of the belt being stiffened by a double layer sewn structure, the tongue having means adjacent to said opening projecting slightly into said double layer sewn structure for preventing said end of the belt from rotating with respect to said tongue, said double layer sewn structure supporting said length at an angle relative to a lower portion of the belt so that the belt does not bear against the neck or face of the seat occupant, and said double layer sewn structure further being flexible enough so that the belt may extend straight from the connecting means when the belt is pulled by the occupant in an emergency.

2. A seat belt device comprising a belt for constraining the upper half of the body of a seat occupant, means for connecting an upper end of the belt to a side roof of a vehicle body, the connecting means comprising a tongue having an opening therein for attaching the tongue to the end of the belt, and tongue receiving means attached to the side roof for connecting the tongue thereto, a length of the belt adjacent to the upper end of the belt being stiffened by a woven structure having a weft density higher than that of the lower portion of the belt, the tongue having means adjacent to said opening projecting slightly into said woven structure for preventing said end of the belt from rotating with respect to said tongue, said woven structure supporting said length at an angle relative to the lower portion of the belt so that the belt does not bear against the neck or face of the seat occupant, and said woven structure being flexible enough so that the belt may extend straight from the connecting means when the belt is pulled by the occupant in an emergency.

* * * * *